Figure 1:
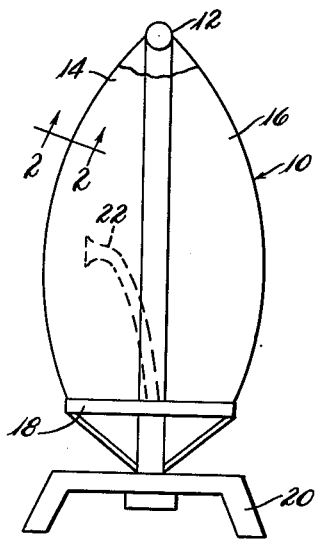

Nov. 26, 1963  H. C. PRICE  3,112,221
ELECTRO-MAGNETIC WAVE REFLECTING LAMINATE
AND METHOD OF MAKING IT
Filed July 6, 1960

VINYL PROTECTIVE LAYER 42
ELECTRO CONDUCTIVE COAT 40
VINYL SMOOTHING COAT 38
VINYL COAT ON FABRIC 34
FIBERGLAS CLOTH 30
VINYL COAT ON FABRIC 32
VINYL PROTECTIVE LAYER 36

INVENTOR.
H. CURTIS PRICE
BY Oldham & Oldham
ATTYS.

United States Patent Office 3,112,221
Patented Nov. 26, 1963

3,112,221
ELECTRO-MAGNETIC WAVE REFLECTING LAMINATE AND METHOD OF MAKING IT
H. Curtis Price, Cuyahoga Falls, Ohio, assignor to Duracote Corporation, Ravenna, Ohio, a corporation of Ohio
Filed July 6, 1960, Ser. No. 41,164
5 Claims. (Cl. 117—217)

This invention relates to flexible fabrics having the characteristic of reflecting electro-magnetic waves in the radar bands, and for other electrical or electronic use.

It has been the usual practice heretofore to build radar reflectors from metal or other rigid materials, these reflectors being appropriately shaped to send and receive radar signals with the signals being concentrated in beam-like patterns by the parabolic or other shape of the reflector. Such rigid reflectors have not adapted themselves to portable or readily movable radar installations, and it has been proposed to make flexible fabric radar reflectors forming a part of an inflatable structure which can be readily deflated and transported to another location where it will be reinflated and set up for use. Such inflatable and deflatable structures themselves form no part of the present invention which is, instead, concerned solely with the construction of the fabric itself adapted to reflect the radar waves or perform similar functions. Heretofore efforts to provide painted, plated or laminated fabrics capable of reflecting radar waves have not been very successful for the reason that the fabric is rolled, folded, or otherwise so bent and crinkled in handling that after a very small number of uses its radar reflective characteristics are largely impaired if not destroyed.

It is the general object of the present invention to avoid and overcome the foregoing and other objections to and difficulties of prior art practices by the provision of an improved fabric laminate characterized by relatively light weight, high strength, dimensional stability to maintain configuration, and the ability to continuously reflect radar or other waves even though the fabric is folded, rolled, and crinkled during handling and during the disassembly of and reassembly of a portable radar station or the like.

Another object of the invention is to provide a relatively inexpensive but very durable and long-lived fabric laminate utilizing glass fiber cloth and carefully controlled thicknesses and materials to effect high adhesion and excellent radar reflective and/or electro-conductive characteristics over wide ranges of temperature and humidity and over a long life period.

Another object of the invention is the provision of an improved method for providing a flexible fabric laminate including an electro-conductive layer.

Another object of the invention is the provision of a particular lightweight and yet high strength fabric having excellent radar wave reflective characteristics and including a carefully protected electro-conductive layer of fused vinyl resin having between about two and about four times as much silver powder therein as it has combined plasticizer and vinyl resin, and with the thickness of the layer being between about one-half and about one and one-half mil.

The foregoing objects of the invention, and other objects which will become apparent as the description proceeds, are achieved by the provision of a flexible foldable laminate for reflecting radar waves and including a glass fiber cloth base, an initial coating of vinyl resin on either side of the cloth base and substantially filling the openings in the cloth base, said initial coatings engaging and adhering to each other through the openings in the cloth base, a protective layer of vinyl resin on one initial coating, a smoth coat of vinyl resin on the other initial coating, an electro-conductive coating of vinyl resin on the smoothing coat, said electro-conductive coating including about one part plasticizer, about three parts of vinyl resin, and between about eight and about sixteen parts powdered silver, said coating being between about one-half and about one and one-half mil thick when fully fused, and a protective layer of vinyl resin on the outer surface of the electro-conductive coating, said coatings and layers being fused intimately together to form the laminate.

Stated in terms of method, the invention provides a flexible, electro-conductive fabric which includes the steps of mixing a solution between about 4% and about 10% of a vinyl resin, between about 1% and about 5% of a plasticizer for vinyl resin, and between about 85% and about 95% of ketone solvent means for vinyl resin, dispersing through the solution by grinding silver powder in an amount between about two and about four times the weight of the combined resin and plasticizer, providing a synthetic fabric, applying the combined solution and silver powder to the fabric in a layer between about ten and about twelve mils thick, evaporating the solvents from the layer to provide a layer between about one-half and about one and one-half mil thick, and fusing with heat the resin and plasticizer in the layer.

Figure 2:
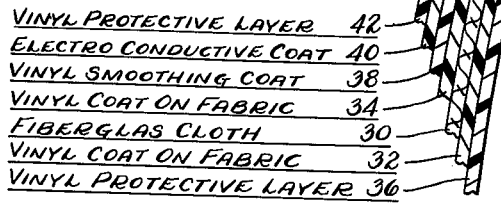

For a better understanding of the invention reference should be had to the accompanying drawings wherein FIG. 1 is a side elevation of a typical radar reflector constructed to utilize the fabric of the invention; and FIG. 2 is a fragmentary view of an enlarged scale of the fabric of the invention and taken, for example, on line 2—2 of FIG. 1.

In the drawings, the numeral 10 indicates generally a radar antenna unit including an inner tube like ring 12 of airtight fabric and adapted to be inflated by means not shown to an internal pressure sufficient so that the tube acts as a structural support for a dish-shaped reflector 14 and dish-shaped lens or cover 16 secured in airtight relation at their outer circumferences with the tube 12 so as to provide an airtight structure which can be inflated internally by means not shown to provide a structure substantially the shape illustrated in FIG. 1.

The pressure inside of the reflector 14 and lens 16 is normally somewhat less than that in the tube 12, but is sufficient to hold the parts as shown. The reflector 14 is made with an integral powdered metal layer to reflect radar waves with high efficiency, whereas the lens 16 is made of airtight fabric having no metallic coating so that it freely passes radar waves. The unit 10 is normally made flat at the bottom and is releasably mounted on or secured to a platform 18 carried upon a support base 20 adapted to move the platform 18 and antenna unit 10 with any desired scanning motion. A wave guide feed horn 22 completes the antenna.

FIG. 2 illustrates with exaggerated thickness the components of the laminated material 14 forming the reflector of radar antenna unit 10. The laminate 14 includes a glass fiber cloth base 30 of relatively high strength, low weight, dimensional stability, and excellent flexibility. Secured to either side of the cloth 30 is an initial coat, sometimes called a blind coat of vinyl resin 32 and 34 which are applied to opposite sides of the glass fiber cloth 30 so as to fill the openings in the cloth, and with the initial coats 32 and 34 adhering to the cloth and to each other through the threads and/or interstices of the cloth. The initial coats 32 and 34 are normally less than about two mils thick after final fusing. The initial coat 32 is covered with a protective layer 36 of vinyl resin, for example about two mils thick after fusing, and the initial coat 34 is covered with a smoothing coat 38 of vinyl resin, for example two mils thick after fusing.

An electro-conductive layer 40 of pigmented vinyl resin is secured on the surface of the smoothing coat 38, and the electro-conductive coat 40 is covered with a protective layer 42 of vinyl resin, again by way of typical example of two mils in thickness after final fusing.

Although layers 36, 32, 34 38 and 42 have been described as being, for example, two mils thick in the fused or cured state, the thickness of these coatings or layers is not critical, and can normally vary between about one and about five mils in thickness. On the other hand, it is preferable in the practice of the invention to keep the thickness of the electro-conductive coating 40 between about one-half mil and about one and one-half mil, this thickness having been proven to be the best able to resist folding, rolling, crinking and the like on the fabric as a whole and still preserve the electro-conductive characteristics and radar reflecting abilities of the fabric.

Considering more particularly the composition of each of the various layers or coatings, these are made up from vinyl resins utilizing known plastisol or organisol formulas and coating technics. However, the composition of the electro-conductive layer is unique. This is a solution of vinyl resin comprising the following:

6%–10% by weight of VYNW
2%–3⅓% by weight of DOP
10%–20% by weight of cyclohexanone
66%–82% by weight of methyl ethyl ketone The VYNW is a trademark of a Bakelite Corporation vinyl resin comprising a co-polymer of 95% vinyl chloride and 5% vinyl acetate. The DOP is the plasticizer dioctylphthalate, and the cyclohexanone and methyl ethyl ketone are ketone solvents. Usually the ratio of plasticizer to vinyl resin is about 1 to 3.

Stated in somewhat broader terms the electro-conductive coat 40 is a vinyl resin solution comprising the following:

Between about 4% and about 10% by weight of a vinyl resin
Between about 1% and about 5% by weight of a vinyl resin plasticizer
Between about 85% and about 95% by weight of ketone solvent means for vinyl resin In making up the material for the electro-conductive coat 40 the clear vinyl resin solution as heretofore described is made up first. Then the silver power is added to the vinyl solution and the silver is dispersed uniformly throughout the vinyl solution, for example in a pebble mill which tends to leaf out the silver. Usually silver powder in an amount between about two and about four parts by weight to one part by weight of the combined plasticizer and resin present in the solution is employed. If a larger percentage of silver is utilized good adhesion of the laminate is lost, and if a less amount of silver is employed the electro-conductive characteristics of the layer are decreased together with the radar wave reflectivity.

The solution with the silver therein is applied to form the coat 40 by means of a spreader knife, doctor bar or applicator roll to a thickness of about ten to twelve mils, and the withdrawal or evaporization of the solvents from the solution together with the settling of the silver powder in the coating results in a shrinkage of the thickness of the wet coating from the ten to twelve mils down to about one-half to one and one-half mils. The resin and plasticizer in the electro-conductive coat 40 fuse up to provide a tough flexible film upon the application of heat to the usual fusing temperatures. Preferably the final fusing heat is not applied to the laminate until all layers or coats are assembled as described.

It will be understood that the silver powder is in a very finely divided form, and that its use is preferable to metal powders, although at least some of the advantages of the invention are obtained with the use of other metal powders, such as aluminum.

The resulting laminate has been found to be satisfactory throughout a wide range of temperature variations, for example, to as low as minus 40 degrees Fahrenheit, and to well over 100 degrees Fahrenheit while retaining the specified advantages of the invention.

The principles of the invention may be applied to the coating or laminating of a plastic strand element to form an electro-conductive coating thereon.

Also, the fabric or laminate of the invention may be used not only as a radar reflector but as a ground cloth, in shielding, in protective shelters, in communication systems, and for other electronic or electrical purposes.

While a certain representative embodiment and details have been shown for the purpose of illustrating the invention, it will be apparent to those skilled in this art that various changes and modifications may be made therein without departing from the spirit of scope of the invention.

What is claimed is:

1. A flexible foldable airtight laminate for reflecting electro-magnetic waves and including a glass fiber cloth base, an initial coating of vinyl resin on both sides of the cloth base and substantially filling the openings in the cloth base, said initial coatings engaging and adhering to each other through the openings in the cloth base, a protective layer about two mils thick of vinyl resin on one initial coating, a smoothing coat about two mils thick of vinyl resin on the other initial coating, an electro-conductive coating of a solution of a vinyl resin covering the smoothing coat, said electro-conductive coating after evaporation of the solvents including about one part by weight plasticizer, about three parts by weight of vinyl resin, and between about eight and about sixteen parts by weight finely ground silver particles, said coating being between about one-half and about one and one-half mil thick when fully fused, and a protective layer about two mils thick of vinyl resin on the outer surface of the electro-conductive coating, said coatings and layers being fused intimately together to form the laminate.

2. A flexible foldable airtight laminate for reflecting electro-magnetic waves and including a glass fiber cloth base, an initial coating of vinyl resin on one side of the cloth base and substantially filling the openings in the cloth base, said initial coating engaging and adhering to the openings in the cloth base, a smoothing coat of vinyl resin on the initial coating, an electro-conductive coating of a solution vinyl resin covering the smoothing coat, said electro-conductive coating including about four parts by weight combined vinyl resin and plasticizer, and between about eight and about sixteen parts ground powdered silver, said coating being between about one-half and about one and one-half mil thick when fully fused, and a protective layer of vinyl resin on the outer surface of the electro-conductive coating, said coatings and layers being fused intimately together to form the laminate.

3. That method of making a flexible air impervious fabric capable of reflecting electro-magnetic waves and performing other electronic functions of similar nature which includes the steps of depositing initial coatings of vinyl resin on both sides of a synthetic fabric, applying a smoothing coat of vinyl resin to the initial coat on one side of the fabric, providing a solution of vinyl resin containing between about 6% and 10% by weight of vinyl resin, between about 2% and about 3⅓% by weight of the plasticizer dioctylphthalate, between about 10% and about 20% by weight of cyclohexanone, and between about 66% and about 82% by weight of methyl ethyl ketone, dispersing uniformly through said solution between about two and about four times as much silver powder as the weight of the combined vinyl resin and plasticizer, applying the combined solution and the silver powder as a layer to the smoothing coat to a thickness of between about ten and about twelve mils, evaporating the solvents from the layer to shrink it to a thickness of between about one-half and one and one-half mils, applying a protective coat of vinyl resin to the layer, and completing the fusing of the assembly by the application of heat.

4. That method of providing a flexible, air impervious electro-conductive fabric which includes the steps of mixing a solution of between about 6% and about 10% by weight of a vinyl resin, between about 2% and about 3⅓% by weight of a plasticizer for vinyl resin, between about 10% and about 20% by weight of a high boiling solvent for vinyl resin, and between about 66% and about 82% by weight of a low boiling solvent for vinyl resin, dispersing through the solution by grinding silver powder in an amount between about two and about four times the weight of the combined resin and plasticizer, providing a synthetic fabric, applying the combined solution and silver powder to the fabric in a layer between about ten and about twelve mils thick, evaporating the solvents from the layer to provide a layer between about one-half and about one and one-half mil thick, while allowing the silver powder to settle to one side thereof, and fusing with heat the resin and plasticizer in the layer.

5. That method of providing a laminate capable of reflecting electro-magnetic waves which includes the steps of mixing a solution of between about 4% and about 10% by weight of a vinyl resin, between about 1% and about 5% by weight of a plasticizer for vinyl resin, and between about 85% and about 95% by weight of ketone solvent means for vinyl resin, dispersing through the solution by grinding silver powder in an amount between about two and about four times the weight of the combined resin and plasticizer, providing a synthetic fabric, applying the combined solution and silver powder to the fabric in a layer between about ten and about twelve mils thick, evaporating the solvents from the layer to provide a layer between about one-half and about one and one-half mil thick, and fusing with heat the resin and plasticizer in the layer.

References Cited in the file of this patent
UNITED STATES PATENTS

| | | |
|---|---|---|
| 2,619,303 | Martin | Nov. 25, 1952 |
| 2,750,321 | Koppelman | June 12, 1956 |
| 2,752,594 | Link et al. | June 26, 1956 |
| 2,769,722 | Converse | Nov. 6, 1956 |
| 2,779,975 | Lee et al. | Feb. 5, 1957 |
| 2,840,819 | McCellan | June 24, 1958 |
| 2,851,380 | Berlinghof | Sept. 9, 1958 |
| 2,875,087 | Crandon | Feb. 24, 1959 |
| 2,913,726 | Currie et al. | Nov. 17, 1959 |
| 2,945,234 | Driscoll | July 12, 1960 |
| 2,959,498 | Sweeny | Nov. 8, 1960 |

FOREIGN PATENTS

| | | |
|---|---|---|
| 834,596 | Great Britain | May 11, 1960 |

OTHER REFERENCES

"Radically New Radar Antenna Inflates Like Balloon," Klass, P.J., Aviation Week, Oct. 22, 1956, pp. 94, 95, 97, and 98.

Mondana: "Radar Reflectors of Reinforced Plastic," Electronic Design, May 28, 1958, vol. 6, pp. 34–37. (Copy in Scientific Library.)